United States Patent [19]

Siri

[11] 4,174,755
[45] Nov. 20, 1979

[54] AGITATOR ASSEMBLY FOR A FRUIT-VINE SEPARATOR

[75] Inventor: Michael P. Siri, Palo Alto, Calif.

[73] Assignee: FMC Corporation, San Jose, Calif.

[21] Appl. No.: 874,296

[22] Filed: Feb. 1, 1978

[51] Int. Cl.² ............................................. A01D 33/02
[52] U.S. Cl. ...................................... 171/27; 56/16.5; 130/30 R; 171/127; 209/308
[58] Field of Search ......................... 171/27, 127, 130; 130/30 R; 56/16.5, 327 R; 209/308, 262–265, 267

[56] References Cited

U.S. PATENT DOCUMENTS

| | | | |
|---|---|---|---|
| 1,131,419 | 3/1915 | Rice | 171/127 |
| 1,632,451 | 6/1927 | Pitcher | 171/127 X |
| 3,071,196 | 1/1963 | Scheidenhelm | 171/127 X |

*Primary Examiner*—Jay N. Eskovitz
*Attorney, Agent, or Firm*—R. S. Kelly; T. J. McNaughton; F. W. Anderson

[57] ABSTRACT

An improved oscillatory separator for a tomato harvester includes an agitator assembly for decompacting the vines carried by a plurality of parallel conveyor chains of the separator to thereby permit loose tomatoes to penetrate the vines and fall between the chains and also for transmitting additional shaking forces to the vines to thereby shake more tomatoes loose from the vines than are shaken loose by the reciprocating conveyor chains alone. The agitator assembly includes a tubular member which is adjustably mounted between the reciprocatable side frame members of the separator to extend transversely below the upper reaches of the conveyor chains. A number of agitator bars are fixed in parallel relationship to the tubular member to extend upwardly at spacings thereon such that the bars are positioned between every other chain. The tubular member is mounted such that the bars are inclined rearwardly (relative to the direction of conveyor chain movement) at a selected angle relative to the plane of the upper reaches of the chains such that the bars project above the chains to thereby lift the vines therefrom and cuase them to tumble as they cascade back to the chains after dropping over the upper ends of the bars. The angle of inclination of the bars is set according to the desired amount of additional shaking force to be imparted to the vines. The height of the tubular member is also adjustable to decrease or increase the height differential between the upper ends of the agitator bars and the conveyor chains.

5 Claims, 7 Drawing Figures

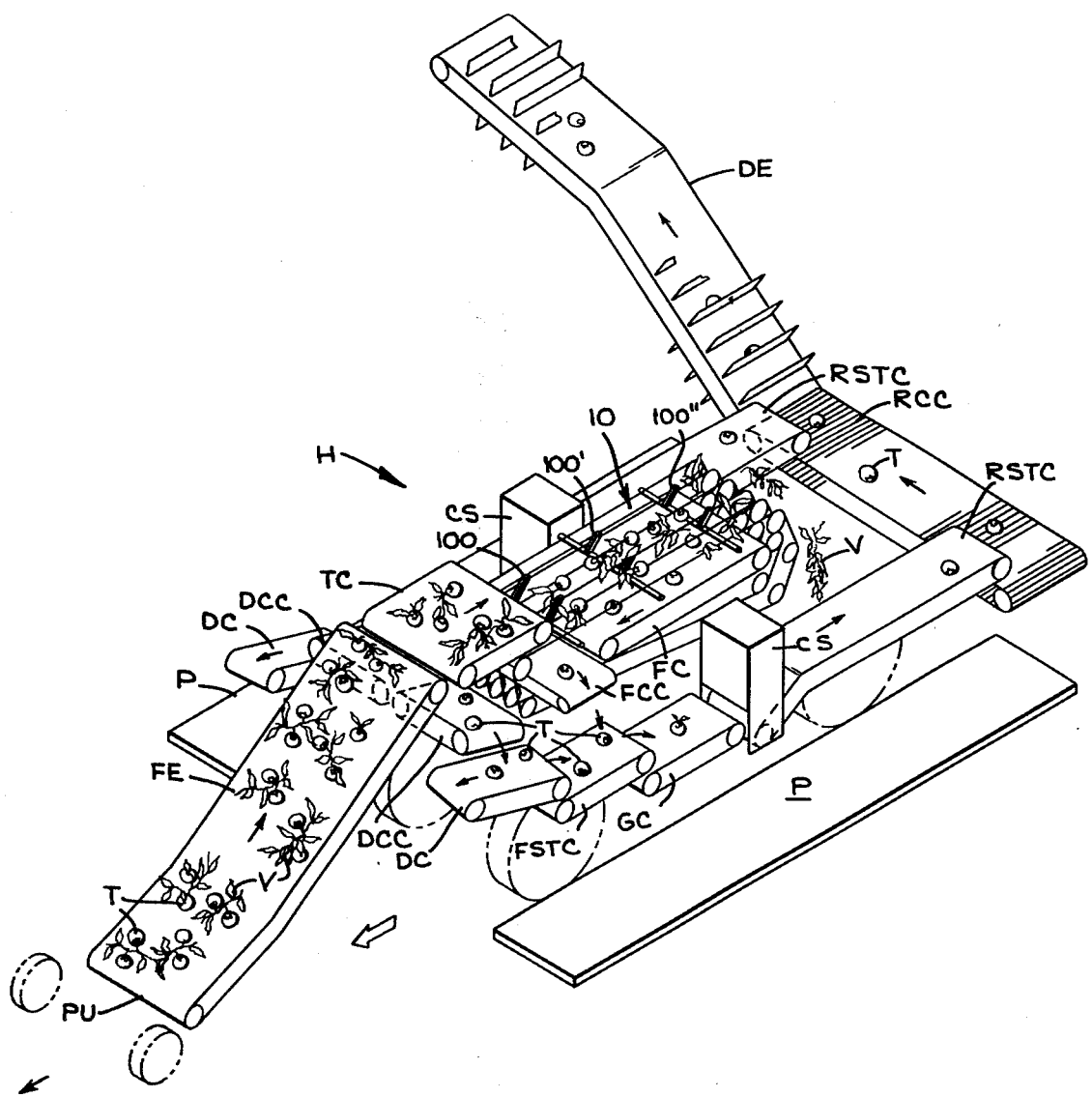
FIG_1

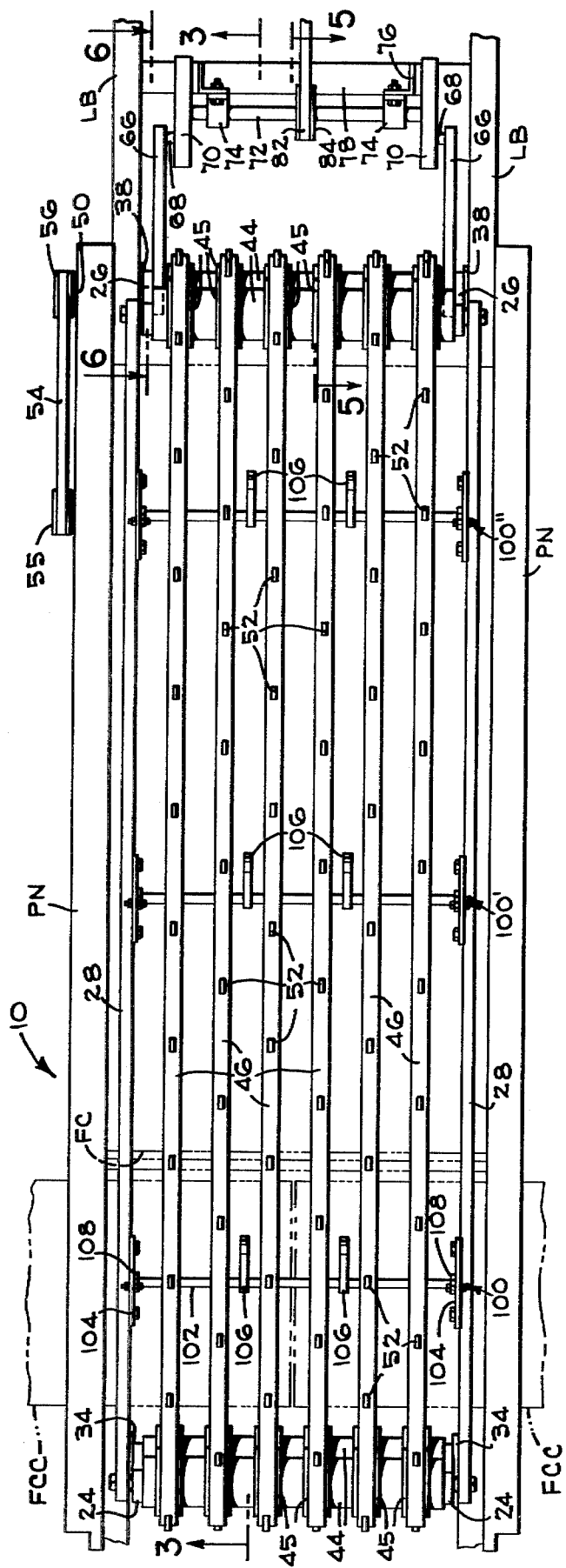
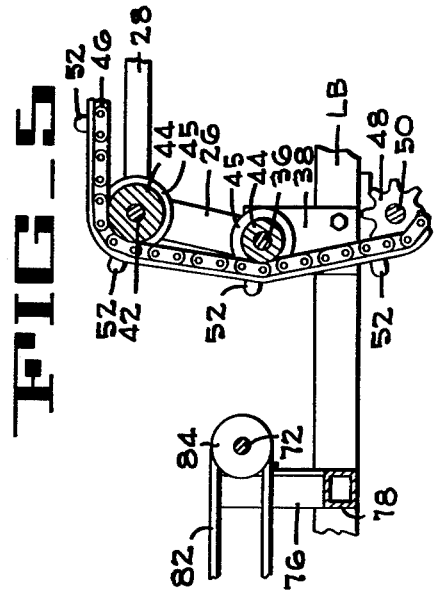
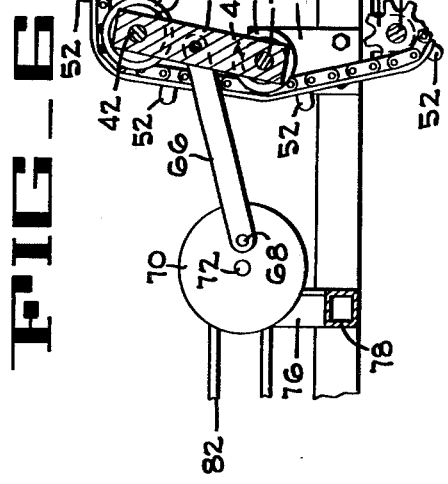

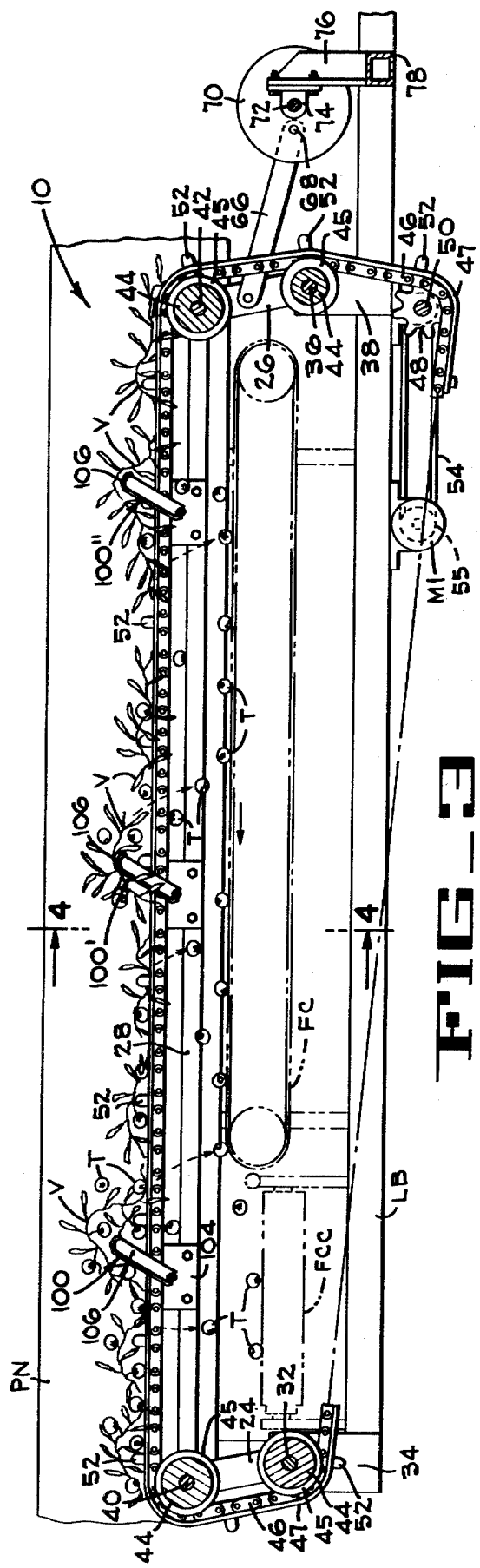
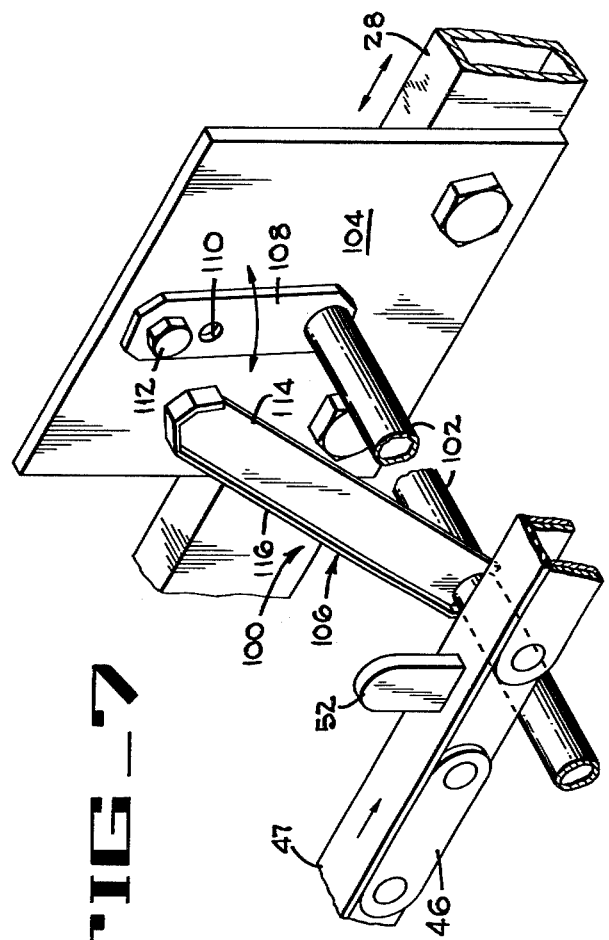

AGITATOR ASSEMBLY FOR A FRUIT-VINE SEPARATOR

BACKGROUND OF THE INVENTION

1. Field of the Invention

The present invention generally relates to vine crop harvesting apparatus and more particularly concerns an improved oscillatory fruit-vine separator adapted for use with a vine crop harvester.

2. Description of the Prior Art

U.S. Pat. No. 3,071,196 to Scheidenhelm discloses a tomato harvester having an oscillatory fruit-vine separator which includes a plurality of endless parallel conveyor chains that are transversely spaced to permit the tomatoes to drop therebetween to an underlying delivery conveyor. The chains are supported by a pair of parallelogram frameworks and are continuously driven while a crankshaft drive mechanism is provided for oscillating the parallelogram frameworks, and thus the conveyor chains. The conveyor chains are provided with outwardly extending fingers which become entangled in the vines to both propel and transmit shaking forces to the vines.

A problem with the oscillating separators of the aforedescribed type is that the vines tend to become so densely matted adjacent to the conveyor chains that some tomatoes shaken from the vines become entrapped on top of the mat of vines and are thereby prevented from penetrating the vines and falling between the conveyor chains onto the underlying delivery conveyor. It will be appreciated that such entrapped tomatoes will be discharged from the separator onto the field, thereby reducing the yield of the harvester from what it should be.

U.S. Pat. No. 3,618,617 to Gates et al discloses an oscillatory fruit-vine separator having a plurality of spaced endless belt conveyors mounted on a frame which is supported at its front end by a rockshaft and at its rear end by crank means. The rockshaft provides a fore-and-aft movement to the front end of the frame, and the crank means drives the rear end of the frame in a generally circular motion involving both vertical and fore-and-aft components. To impart a rotary movement to the vines as they are conveyed by the belt conveyors, the Gates et al separator further includes a plurality of tines which are mounted so as to project downwardly from above the separator into upper portions of the vines carried on the belt conveyors. The rods are mounted so that they do not oscillate with the frame carrying the belt conveyors. The patent states that the tines act to impale a vine and slow the progress of part of it, while the rest of the vine continues to be pulled along by the belts of the separator. The rods thereby rotate the vines as they are conveyed.

SUMMARY OF THE INVENTION

The present invention provides an improved oscillatory fruit-vine separator for a mechanical harvester of crops such as tomatoes wherein the fruit is separated from the remainder of the plant by an oscillating action. In accordance with the improvement of the present invention a shaker conveyor is provided which is comprised of a plurality of parallel endless conveyors. Means are provided to continuously drive the endless conveyors which are arranged in spaced parallel relationship and mounted upon a frame which is subjected to continuous oscillatory movement in the planes of the conveyors. An agitator assembly is also mounted upon the oscillating frame. The agitator assembly includes a number of spaced parallel agitator elements which extend upwardly between the conveyors to a selected height above the conveying surface of the conveyors. The agitator elements serve to lift the vine masses from the conveyors as they are moved and to cause the vines and tomatoes to tumble as they cascade over the tops of the agitator elements to thereby increase the shaking forces on the vines while decompacting the vines and enabling the tomatoes that have shaken loose to penetrate the vine masses and fall through the conveyors to an underlying recovery means.

The agitator elements each comprise a bar affixed to a transverse member such that they extend rearwardly, with respect to the direction of conveyor movement, at a selected angle with respect to the supporting surface of the conveyors. The distal ends of the bars project upwardly to a selected height above the conveyors. The transverse member is rigidly mounted to the oscillating frame so that the agitator bars oscillate with the frame. It is preferable that the transverse member be adjustably secured to the oscillating conveyor frame so as to permit the rearward inclination and the selected height of the ends of the agitator bars to be changed according to various harvesting conditions. For example, when tomatoes on the plants to be harvested are relatively immature and cling more tenaciously to the vines, the bars should be adjusted to provide a relatively steep angle with respect to the conveyors, to thereby elevate the distal ends of the bars and impart more shaking action to the vines. On the other hand, when the tomatoes being harvested and more readily separable from the vines and are therefore relatively fragile, the transverse member would be adjusted to tilt the bars more toward the downstream end of the conveyors, thereby reducing the shaking forces imparted by the bars while yet still permitting decompaction of the vines.

It will thus be appreciated that the agitator assembly of the present invention provides an improved oscillatory fruit-vine separator which can transfer a higher percentage of fruit to an underlying recovery means.

BRIEF DESCRIPTION OF THE DRAWINGS

FIG. 1 is a diagrammatic perspective view illustrating the flow of harvested vines and tomatoes in a tomato harvester which incorporates the improved fruit-vine separator of the present invention.

FIG. 2 is a top plan view of a preferred embodiment of the improved separator of the present invention.

FIG. 3 is a section taken on line 3—3 of FIG. 2.

FIG. 4 is a section taken on line 4—4 of FIG. 3.

FIG. 5 is a section taken on line 5—5 of FIG. 2.

FIG. 6 is a section taken on line 6—6 of FIG. 2.

FIG. 7 is an enlarged fragmentary isometric view illustrating a portion of the agitator assembly of the improved separator.

DESCRIPTION OF THE PREFERRED EMBODIMENTS

FIG. 1 diagrammatically illustrates a tomato harvester H which incorporates the improved fruit-vine separator of the present invention. To obtain further details of construction of the tomato harvester as a whole, reference may be made to the co-pending U.S. patent application, Ser. No. 775,002, filed Mar. 7, 1977 by F. Orlando et al; such co-pending application is assigned to the assignee of the present invention and is specifically incorporated hereby by reference. It will be understood that the utility of the improved separator of the present invention is not limited to the particular harvester shown and described herein. Those skilled in the crop harvesting art will readily appreciate that the present invention may be utilized in other types of tomato harvesters and also in harvesters for vine crops other than tomatoes wherein an oscillatory shaking action is used to separate the fruit from the remainder of the plant.

Briefly, and with general reference to broad functions, the tomato harvesting machine H is adapted to be propelled along a path of tomato plants to be harvested. It includes a pickup, or harvesting, mechanism PU, supported on a pair of front wheels, which cuts vines along the path at ground level and conveys the vines with the attached and some loose tomatoes onto a feeder elevator FE. The feeder elevator FE conveys the vines and tomatoes to a central section of the harvester disposed between a pair of upstanding side panels PN (not shown in FIG. 1, but shown in FIGS. 2-4). The side panels PN are attached to longitudinal beams LB of the main frame of the harvester H (FIGS. 2-6).

At the top front of the central section of the harvester there is a transfer conveyor TC having its input end positioned to receive the output of the feeder conveyor FE, but spaced a short distance from the end of the conveyor FE to allow loose tomatoes and dirt clods to drop from the masses of vines and attached tomatoes through the space between the two conveyors. The loose tomatoes and dirt clods are then transferred laterally by a pair of oppositely directed cross-conveyors DCC to the sides of the harvester. Each side includes a forwardly and upwardly driven dirt conveyors DC which is adapted to permit loose tomatoes to roll rearwardly to a front sorter conveyor FSTC while propelling the nonrollable dirt and clods forwardly to be discharged back to the ground. Sorters standing on platforms P at the sides of the harvester remove undesirable tomatoes and trash transferred from the dirt conveyors to the front sorter conveyors FSTC.

The transfer conveyor TC discharges the vines with attached tomatoes to the improved fruit-vine separator 10 of the present invention which oscillates the vines so as to detach the tomatoes therefrom and transfer the detached tomatoes to an underlying fruit delivery conveyor FC. The vines are ejected from the rear end of the separator 10 onto the ground. The present invention concerns the separator 10 and provides agitator assemblies 100, 100', and 100" incorporated in the separator for assuring that the fruit detached from the vines will make its way through the vines onto the delivery conveyor FC and also for imparting additional shaking forces to the vines to hence detach a greater percentage of tomatoes from the vines. The separator, and particularly the agitator assemblies thereof, will be described in detail hereinafter. It should be noted at this point that the improved separator 10 includes an oscillating framework, conveyor chains, and separate drive mechanisms for the framework and chains—all of which are essentially the same as disclosed in the aforementioned U.S. Pat. No. 3,071,196 to E. L. Scheidenhelm.

The tomatoes that drop through the separator 10 to the fruit delivery conveyor FC are carried forwardly thereby to a pair of oppositely directed cross-conveyors FCC which, in turn, carry the tomatoes transversely through the side panels PN and deposit them on the aforementioned sorter conveyors FSTC at the sides of the harvester. Each sorter conveyor FSTC delivers the tomatoes to a grooved conveyor GC which singulates the tomatoes into rows for feeding to an automatic color sorter CS. Each color sorter CS detects the color intensities of the tomatoes, ejects those tomatoes whose colors are indicative of insufficient ripeness, and transfers the ripe tomatoes to a rear sorter conveyor RSTC. The tomatoes are ejected from both of the rear sorter conveyors onto a rear cross-conveyor RCC which, in turn, transfers the tomatoes to a discharge elevator DE extending laterally from the harvester. The tomatoes are finally discharged from the elevator DE into a truck (not illustrated) for transportation to the processing plant.

Next referring to FIGS. 2-7, it will be seen that the improved separator 10 includes an oscillating framework comprised of a pair of front legs 24 (FIGS. 2 and 3), a pair of rear legs 26 (FIGS. 2, 5 and 6), and a pair of side frame member 28 (FIG. 2) each of which are pivotally connected to the upper ends of one set of the front and rear legs. The pair of front legs 24 is pivotally supported on a shaft 32 (FIG. 3) which is, in turn, supported by a pair of brackets 34 that are attached to the longitudinal beams LB of the main frame of the harvester. The pair of rear legs 26 is similarly pivotally supported on a shaft 36 extending between a pair of brackets 38 also mounted to the longitudinal beams LB of the harvester frame. The front ends of the side frame members 28 are respectively pivotally mounted on the ends of a shaft 40 which extends between the upper ends of the front legs 24; and the rear ends of the side frame members are pivotally supported on another shaft 42 extending between the upper ends of the rear legs 26. Thus, it will be seen that the oscillating framework is comprised of a pair of longitudinally extending parallelogram linkages mounted in a parallel relationship to the longitudinal beams LB of the harvester frame.

Each of the shafts 32, 36, 40, and 42 has a flanged idler roller 44 rotatably mounted thereof. Six parallel conveyor chains 46 are entrained on the rollers between pairs of flanges 45 which pairs are spaced at uniform intervals along the length of the rollers. The conveyor chains 46 are also entrained on drive sprockets 48 which are affixed to a shaft 50 rotatably supported within bearings which are bolted to the longitudinal beams LB (FIG. 3). As best seen in FIG. 5, the shaft 50 is mounted to the undersides of the longitudinal beams LB below the brackets 38 to which the rear legs 26 are pivotally mounted. The conveyor chains 46 have uniformly spaced fingers 52 projecting approximately 3 inches outwardly from the conveying surface of the chains, said fingers being distributed at uniform intervals throughout the length of the chains as seen in FIGS. 2 and 3. The conveying surfaces of the chains are covered with flat rubber strips 47 which have spaced apertures therein through which the fingers 52 project. The fingers serve to entangle the tomato vines V (FIG. 3) which are dropped from the transfer conveyor TC (FIG. 1) onto the chains to thereby permit the chains to propel the vines through the separator. As shown in FIGS. 2 and 3, the upper reaches of the chains 46 are continuously moved rearwardly by a drive mechanism comprising a hydraulic motor M1 (FIG. 3) and a belt 54 which is entrained on a pulley 55 coupled to the hydraulic motor and a pulley 56 (FIG. 2) coupled to the shaft 50. The speed of the hydraulic motor M1 is regulated in accordance with the ground speed of the harvester H.

Referring now to FIGS. 2 and 6, it will be seen that a pair of crank arms 66 are pivotally mounted to the pair of front legs 24 at transversely aligned positions thereon. The rear end of each crank arm is pivotally engaged upon a pin 68 extending eccentrically from a crank wheel 70. The crank wheels 70 are secured upon the ends of a transversely oriented shaft 72 so that the crank arms 66 are maintained in parallel relationship as the crank wheels are rotated by driving the shaft 72. The shaft 72 is rotatably carried by a pair of bearings 74 which are bolted to upright brackets 76; the brackets 76 are mounted to a channel 78 which extends transversely between the longitudinal beams LB. A pulley 84 is fixed to the shaft 72, and a drive belt 82 is entrained about the pulley 84. The drive belt 82 is driven by a further hydraulic motor (not illustrated). With the aforedescribed arrangement the framework of the separator 10 may be oscillated at a constant preselected speed, while the speed of motor M1 powering the conveyor chains 46 is regulated according to the ground speed of the harvester, and thus, the quantity of the harvested vine crops delivered to the separator.

As described in the aforementioned U.S. Pat. No. 3,071,196, when power is supplied to rotate the drive shaft 72, the crank arms 66 will swing the rear legs 26 back and forth to thereby cause the side frame members 28 (and thus the upper reaches of the conveyor chains 46) to oscillate forwardly and backwardly generally in a horizontal plane. Simultaneously, the chains 46 propel the vines V and tomatoes T rearwardly until the vines are discharged at the rearward end of the separator. Of course, the object of the oscillating of the chains 46 is to shake the tomatoes T loose from the vines. It will be appreciated that the primary shaking forces are applied to the vines by the fingers 52 of the chains 46.

As previously indicated, it has been found that the bottom portions of the masses of vines V carried on the chains 46 (FIG. 3) may become compacted under the weight of these tomatoes T which are distributed in the upper portions of the vine masses. Due to this compaction, the loose tomatoes are prevented from moving through the vines to the underlying fruit delivery conveyor FC, and thus the yield of the harvester is reduced. Tomatoes which are shaken loose from the vines but which do not penetrate the vines due to such compaction are discharged from the rear end of the conveyor chains 46 onto the ground. To obviate this problem, and to also provide additional shaking forces to remove a greater percentage of the tomatoes from the vines, three agitator assemblies 100, 100′ and 100″ (FIG. 2) are provided for decompacting the vines carried on the chains 46 to an extent which permits the detached tomatoes to penetrate the vines and fall onto the underlying conveyor FC.

As illustrated in FIGS. 2 and 3, the three agitator assemblies are mounted to and extend between the side frame members 28 of the separator. The first assembly 100 is mounted near the upstream end of the side frame members 28, a second agitator assembly 100′ midway along the side frame members, and the third assembly 100″ adjacent the downstream ends thereof. Since the three agitator assemblies are identically constructed, the following description will be directed to the construction of the upstream agitator assembly 100 only, it being understood that assemblies 100′ and 100″ are the same.

As illustrated in FIGS. 2–4 and 7, the agitator assembly 100 comprises a tubular member 102 which is adjustably mounted by a pair of brackets 104 to the side frame members 28 so as to extend transversely below the upper reaches of the chains 46 of the separator 10. Two agitator bars 106 are welded to the tubular member 102 so as to extend radially therefrom in an upwardly and rearwardly inclined direction. To enable the adjustable mounting of the tubular member 102 to the side frame members 28, a mounting strip 108 (FIG. 7) is welded to each end of the tubular member such that the strips 108 are parallel to each other and each forms a selected angle with the agitator bars 106. As illustrated in FIG. 7, each mounting strip 108 has two bores formed therein, with one bore (obscured by the bolt 112) being formed at the outer end of the mounting strip and the other bore 110 being located a short distance inwardly thereof. The mounting strips are adjustably attached by bolts 112 to the respective brackets 104, said bolts extending through one of the two bores to clamp the mounting strips to the brackets. When it is desired to adjust the angular mounting of the agitator bars, the bolts 112 are loosened and the strips 108 are rotated about the axis of the bolts as shown by the arrows in FIG. 7.

Each of the agitator bars 106 consists of a flat metal strut 114 welded to the tubular member 102 such that the plane of the strut is perpendicular to the axis of the tubular member and thus parallel to the direction of travel of the chains 46. A relatively wide facing strip 116 is welded to the upper edge of the strut 114 to provide an inclined flat surface for elevating the vines from the chains. The outer end of the strut 114 is beveled and the strip 116 is bent to conform to such beveled end and to thereby reduce the possibility that vines will be entangled on or that the tomatoes will be damaged by the agitator bar. The agitator bars 106 are spaced on the tubular member 102 so as to lie midway between the second and third chains and the fourth and fifth chains of the separator (FIG. 2), i.e., so as to lie between every other row of the separator chains.

As best seen in FIG. 7, the tubular member 102 is adjustably mounted by the strips 108 to the brackets 104 to secure the bars 106 in a desired rearwardly inclined orientation. The exact angle of rearward inclination of the bars will vary according to the amount of additional shaking forces desired. The supplemental shaking forces imparted by the bars 106 to the vines may be increased by increasing the slope of the bars, and vice versa. In field testing under conditions where the tomatoes were relatively green and difficult to remove from the vines, the mounting strips 108 were mounted with bolts 112 secured through the outer bores of the mounting strips such that under ends of the agitator bars were about 5 inches above the tops of the fingers 52 and such that the agitator bars were oriented at an angle of 30° from the vertical, as depicted in FIGS. 3 and 7. When the tomatoes being harvested are not so green and are thus easier to shake loose from the vines but, on the other hand, are more subject to damage, the agitator bars may be set at a more gradual slope, that is, at a greater angle to the vertical. This is accomplished by loosening the bolts 112 and rotating the tubular member about the axis of the bolts as explained hereinbefore.

As indicated above, the bars 106 are not only adjustable in terms of their angle relative to the conveyor chains 46 but also in terms of their height relative to the top ends of the chain fingers 52. By reinserting the bolts 112 through the inner mounting bores 110 of the strips 108, the agitator bars are mountable at a higher position relative to the conveyor surface while remaining at the same angle of inclination with respect to the conveyor chains 46. At such higher position, the top ends of the agitator bars are, of course, considerably higher above the chains and thereby enhance the tumbling effect which results in decompacting the vine masses. It will be appreciated that a wide range of adjustment is provided by this mounting arrangement, thereby enabling the oscillatory separator to efficiently handle tomatoes under widely varying field conditions with minimal damage to the tomatoes.

It will be seen (FIG. 3) that the agitator bars 106 of each of the three agitator assemblies 100, 100' and 100" are inclined rearwardly at the same angle from the vertical. It will be understood that the various agitator assemblies may be mounted such that the agitator bars thereof form different angles with the upper reaches of the conveyor chains 46, thereby imparting different amounts of shaking forces at different positions along the separator.

Thus, the agitator assembly of the present invention may be utilized with a conventional oscillatory separator to decompact the vines thereon as they are shaken in the horizontal plane and thus increase the yield by permitting more tomatoes to drop vertically through the vines. Damage to the tomatoes is minimized by carefully controlling the amount of additional shaking forces imparted by adjustment of the agitator bars. Thus, a higher yield of tomatoes may be obtained without sacrificing the quality of the relatively fragile harvested output.

Although the best mode contemplated for the present invention has been herein shown and described, it will be apparent that modification and variation may be made without departing from what is regarded to be the subject matter of the invention.

What is claimed is:

1. An agitator assembly for use in combination with an apparatus for separating fruits such as tomatoes from the vines of the plant, the separating apparatus being of the oscillatory type including a pair of longitudinally extending side frame members, a pair of shafts mounted transversely between the front and rear ends of the side frame members, a plurality of parallel endless conveyors having spaces therebetween through which separated fruits may fall and parallel reaches for conveying the vines, said conveyors being supported on said shafts, means for synchronously oscillating said side frame members in fore-and-aft directions parallel to said conveyors, and means for simultaneously continuously driving said conveyors in a direction of travel, said agitator assembly comprising: a member mounted transversely between said side frame members below said reaches of said conveyors; and a plurality of agitator bars rigidly mounted to said transverse member in parallel relationship and at intervals aligned with the spaces between said conveyors; each agitator bar having an upstream face which is upwardly inclined in said direction of travel of the conveyors at a selected acute angle relative to the conveyor reaches and with the upstream faces of said agitator bars extending above the conveyor reaches, whereby the vines on the conveyors are lifted as the vines are conveyed in said direction of travel and are dropped back onto said conveyors as they move over the agitator bars to hence facilitate the movement of the fruit downwardly through the vines.

2. The agitator assembly according to claim 1 wherein said transverse member is adjustably mounted to said side frame members of said separator to enable said bars to be adjusted at various selected acute angles relative to the reaches of said conveyors.

3. The apparatus according to claim 2 further comprising means for adjusting the height of said transverse member relative to said side frame members of said separator, thereby also enabling the adjustment of the height of the upper ends of said bars above said conveyors.

4. In a vine crop harvester having a mobile framework and harvesting means on said framework adapted to cut a row of vines and to carry the vines and fruit attached thereto to a discharge area, an improved separator apparatus comprising: conveyor means extending under said discharge area for carrying the vines and fruit deposited thereon, said conveyor means including a plurality of parallel transversely spaced endless conveyors, each conveyor having means for entangling and moving the vines, the upper reaches of said conveyors being supported at their upstream and downstream ends on transversely extending shafts and said shafts being mounted between the ends of a pair of longitudinal said frame members; delivery means directly below said conveyor means for receiving fruit falling between the upper reaches of said plurality of conveyors; means mounted on said harvester frameword for oscillating said side frame members and thus said shafts in a direction generally parallel to the direction of movement of said upper reaches of said conveyors; a member mounted transversely between said side frame members below said upper reaches of said conveyors; and agitator means mounted to said transversely extending member and extending upwardly from said transversely mounted member for lifting the vines and fruits suspended thereon from said upper reaches of said conveyors and for causing said vines and fruits to cascade back to said conveyors after they have been lifted therefrom to thereby decompact the vines and thus facilitate the movement of the fruit through the vines to the delivery means, said agitator means including a plurality of bars that are rigidly mounted to said transversely extending member to project upwardly through said conveyor reaches and forwardly at selected angles relative to said reaches.

5. In a fruit-vine separator of the type comprised of a separator frame, a plurality of endless conveying means including a plurality of chains arranged in spaced parallel relationship on said frame, means for continuously driving said conveying means, and means for continuously reciprocating said conveying means in planes generally parallel to the direction of conveying movement of the conveying means, the improvement comprising a member that is rigidly mounted to said separator frame to extend transversely of said conveying means, an agitator bar uprightly and rigidly connected to said transverse member so as to reciprocate therewith, said agitator bar being positioned on said transverse member between two of the chains of said conveying means and extending upwardly above said chains and forwardly at a selected acute angle therewith in the direction of travel of the chains, whereby said agitator bar serves to lift the vines from the conveying chains to aid in the delivery of fruit through the separator to an underlying fruit collector.

* * * * *